United States Patent
Sacks et al.

[15] 3,635,076
[45] Jan. 18, 1972

[54] STRAIN-SENSING DEVICE

[72] Inventors: Ivor Selwyn Sacks, Chevy Chase, Md.;
Dale Evertson, Austin, Tex.

[73] Assignee: Carnegie Institution of Washington

[22] Filed: July 29, 1969

[21] Appl. No.: 845,790

[52] U.S. Cl. ..................................73/88.5, 73/88 E
[51] Int. Cl. ..................................G01b 7/16, G01n 3/00
[58] Field of Search ........73/88 E, 431, 398, 84, 16; 92/177; 33/1 E

[56] References Cited

UNITED STATES PATENTS

| | | | |
|---|---|---|---|
| 3,187,300 | 6/1965 | Brate | 73/398 |
| 3,198,013 | 8/1965 | Erdely | 73/398 |
| 1,957,894 | 5/1934 | Longenecker | 73/392 |
| 2,347,903 | 5/1944 | Gluck et al. | 138/40 |
| 2,370,965 | 3/1945 | Kahn | 138/46 |
| 3,083,321 | 3/1963 | Howe | 318/19 |
| 3,142,794 | 7/1964 | Pegram | 323/51 |
| 3,068,700 | 12/1962 | Bourns | 73/398 |
| 3,286,514 | 11/1966 | Anderson | 73/88.5 |
| 3,374,403 | 3/1968 | Larkam et al. | 317/231 |
| 3,404,460 | 10/1968 | Livingston et al. | 33/125 |
| 3,427,876 | 2/1969 | Steele et al. | 73/141 |
| 3,461,726 | 8/1969 | Ziegler | 73/398 |
| 3,483,745 | 12/1969 | Ublacker | 73/151 |

FOREIGN PATENTS OR APPLICATIONS

| | | | |
|---|---|---|---|
| 1,299,135 | 7/1969 | Germany | 73/141 |
| 262,587 | 10/1949 | Switzerland | 62/ |
| 147,356 | 10/1962 | U.S.S.R. | 42/10/62 |
| 226,589 | 11/1958 | Australia | 601/6 |
| 335,564 | 2/1959 | Switzerland | 42 K/45/01 |

*Primary Examiner*—Richard C. Queisser
*Assistant Examiner*—John Whalen
*Attorney*—Stowell & Stowell

[57] ABSTRACT

A device for detecting deformation in solids having a housing insertable in the solid and a closed container in the housing. A strain-sensing device communicates with the interior of the housing and liquid filling the housing couples the walls thereof to the sensing device. Expandable cement couples the walls of the housing to the surrounding solid to transmit deformations therebetween.

9 Claims, 8 Drawing Figures

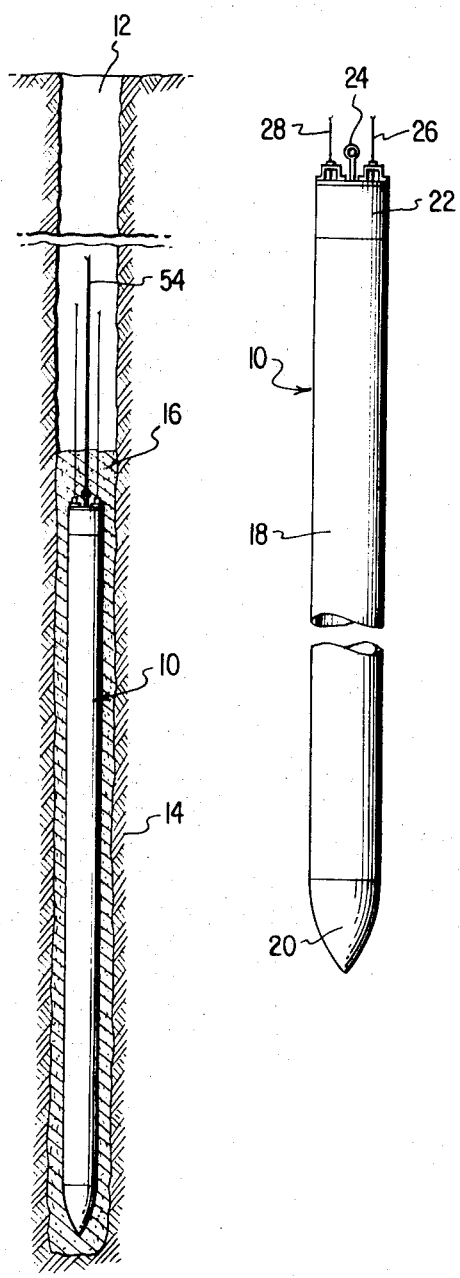
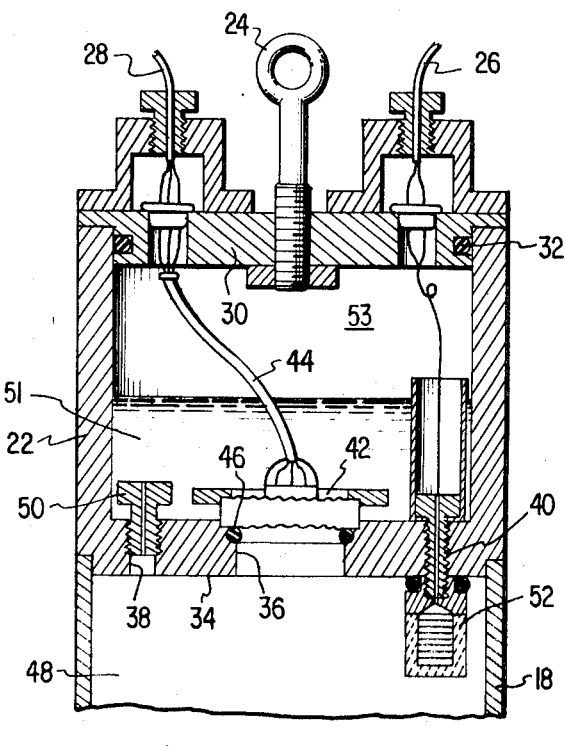

INVENTORS.
IVOR SELWYN SACKS
DALE EVERTSON

BY *Stowell & Stowell*

ATTORNEYS.

STRAIN-SENSING DEVICE

BACKGROUND OF THE INVENTION

The invention relates generally to devices for detecting strains and deformations in solids and more particularly to devices adapted to detect strains in the earth.

In the prior art, there are many devices for detecting earth shocks and tremors. Among such devices are mechanical and electronic vibration detectors which generally sense the energy from shock waves transmitted through the earth's crust.

Although prior art devices have proved suitable for most purposes, there is a continuing and increasing need for more sensitive detectors for sensing faint earth strains.

SUMMARY OF THE INVENTION

This invention provides a device for detecting deformations in solids which has greater sensitivity than those heretofore available. Although specifically described hereinafter as applied to earth deformation sensing devices, it should be understood that devices in accordance with this invention can find utility in sensing strains in any solid structure such as dams, walls or the like, if so desired.

The invention also provides a device limited to sensing deformations in predetermined directions by furnishing structure to block transmission of deformations to the device in selected directions.

The invention further provides a device for sensing deformations in the earth by furnishing means to imbed and couple a strain-sensing device in surrounding earth formations with a minimum of lost motion in the transmission of deformations between the earth formation and the sensing device by furnishing a hydraulic coupling between the formation and the device.

In a preferred embodiment, the objects of this invention are achieved by providing a housing insertable in a bore hole in the earth; a closed container in the housing; a strain-sensing device communicating with the interior of the housing; a liquid filling the housing to couple the walls thereof to the sensing device; and expanded cement in the bore hole around the housing to couple the walls of the container to the surrounding earth structure and transmit deformations therebetween.

These and other objects of the invention along with the attendant advantages thereof will become better understood to those skilled in the art by reference to the following detailed description when viewed in light of the accompanying drawings wherein like numerals throughout the figures thereof indicate like components and wherein:

BRIEF DESCRIPTION OF THE DRAWINGS

FIG. 1 is an elevational view of a device in accordance with the invention installed in a bore hole;

FIG. 2 is an enlarged fragmentary elevational view of the device of FIG. 1;

FIG. 3 is a further enlarged fragmentary sectional detailed view of a portion of the device of FIG. 1;

FIG. 4 is a view similar to FIG. 3 showing a variation of the device in accordance with the invention;

DESCRIPTION OF THE PREFERRED EMBODIMENT

Figure 5:
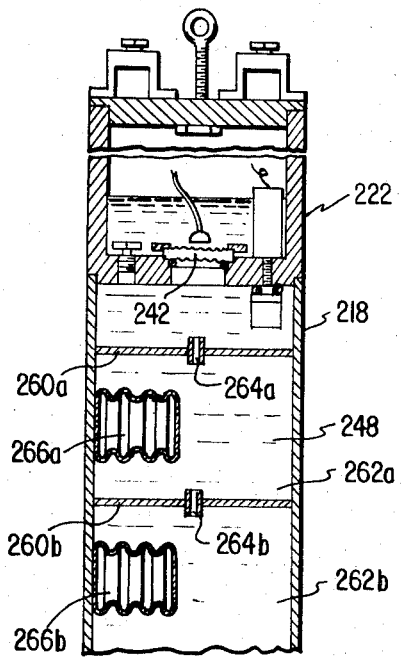
FIG. 5 is a reduced view similar to FIG. 4 showing another variation of the device in accordance with the invention.

Referring first to FIG. 1 of the drawings, the device comprises a casing shown generally at 10 disposed in a bore hole 12 in the earth and intimately coupled with the surrounding earth structure 14 by a cement packing 16. The packing 16 preferably comprises an expansive cement such, for example, as one of the calcium aluminosulfate containing expansive cements described in U.S. Pat. Nos. 3,155,526; 3,251,701 and 3,030,037 to Klein.

In FIG. 2 the casing 10 comprises a cylindrical housing wall 18, an ogival nose 20, preferably formed of or containing a heavy ballast material, and a sensor portion 22. At least the housing wall 18 is preferably formed of a tough, flexible metal such, for example, as stainless steel. A cable connecting eye 24 is provided on the upper end of the sensor portion 22 with electrical leads 26 and 28 connected on either side thereof.

In FIG. 3, the sensor section 22, shown in elevational section, comprises a removable cap 30 sealing the upper end of the section 22 by means of an O-ring 32 and a lower wall 34 having a central bore 36 and a pair of side bores 38 and 40 therethrough. A strain sensor 42 is disposed in the central bore 36 and is connected to the lead 28 by means of a connector 44. The sensor 42 may be one of any of the types known in the art; however, it is preferred that a solion transducer of the type described in U.S. Pat. No. 3,374,403 to Larkam et al. be used for this purpose. The solion transducer generally comprises an electrolyte filled housing having a flexible diaphragm at either end. A pair of porous cathodes are disposed in the housing and anodes are disposed between the cathodes and the diaphragms. Upon any deflection of the diaphragms, the electrolyte flows through the anodes and cathodes and generates electrical signals which are proportional to the velocity of flow and therefore the rate of deformation of the diaphragms. Since the void between the diaphragms is filled with liquid, the solion adjusts itself to the pressures encountered at the operating depth. The sensor 42 is sealed in the bore 36 by means of O-ring 46.

The housing formed by the wall 18 is filled with a liquid 48 which contacts with the lower surface of the sensor 42 in such a manner that any deformation of the walls 18 is transmitted through the liquid to the diaphragms of the sensor. The fluid therefore provides a hydraulic coupling medium through which any deformation of the walls 18 is transmitted through the sensor 42 without lost motion to the hydraulic sump 51 above which is gas space 53. A capillary bypass 50 is threaded in the bore 38 to provide for displacement of fluid to or from the sump 51 for long period variations in volume of the fluid 48 such as those due to temperature changes or the like. The bypass can be formed, as is known in the art, to restrict flow therethrough to a sufficient degree to permit transmission of shorter period changes in volume or variations in pressure to the sensor 42. As an example, a capillary bypass 0.004 inch in internal diameter and 1 inch long has been found suitable for the purposes of this invention.

The liquid 48 may consist of any liquid compatible with the structure of the device; however, water saturated with chloroform to inhibit microbial growth has been found to be suitable for the purposes of the invention.

A step volume change calibrator 52, preferably of the ceramic type, is connected through the bore 40 to the lead 26 for purposes of calibrating the device.

The device is positioned at the desired point in the earth by drilling the bore hole 12 to the desired depth, filling the lower portion of the hole with a charge of packing concrete 16 and lowering the casing 10 into the concrete by means of a cable 54 (FIG. 1). By the use of an expansive cement as described above, the packing 16 expands upon curing, thereby intimately coupling the walls 18 with the surrounding structure 14. In the device disclosed, it has been found that a prestressing, on the order of about 7 lbs. per square inch, occurs after the packing is cured.

Referring to FIG. 3, as the strain in the surrounding structure 14 changes, the bore hole will be distorted and the wall 18 will follow the hole deformation. As the housing wall is deformed, the volume thereof changes and the pressure in the liquid therein thereby changes, which pressure change is sensed by the sensor 42. The thickness of the walls 18 is preferably chosen such that the rigidity thereof is on a par with that of the surrounding earth structure 14. The casing 10 may also be pressurized to equalize the stress in the earth structure surrounding the device.

Referring now to FIG. 4, a variation in accordance with the invention is illustrated. In this variation, components thereof corresponding to like components of the preceding embodiment are indicated by like numerals only of the next higher order.

The primary distinction in the embodiment of FIG. 4 over that of the embodiment of FIG. 3 is in the nature of the pressure sensing device 142. The pressure sensing device of FIG. 4 comprises a sylphon bellows 156 coupled to a differential transformer 158. The transformer 158 provides an electrical indication of the change in length of the bellows 156 in a manner know in the art. A transverse wall 134, having a central bore 136 therethrough is disposed across the sensing portion 122 with the bellows 156 communicating with the liquid 148 through the bore.

Where desired, and as illustrated in FIG. 4, the sensing device may also include a solion transducer 42', a ceramic-type calibrator 52' and a capillary bypass 50' which may be identical to such devices illustrated and described in reference to FIG. 3 of the drawing.

In operation, the device of FIG. 4 functions in substantially the same manner as the device of the preceding figures with the exception that pressure changes in the liquid 148 due to deformation of walls 118 cause a change in the length of the bellows 156 which change is sensed by the differential transformer 158 and transmitted through the lead 128.

With reference now to FIG. 5 of the drawings, a further embodiment in accordance with the invention incorporating frequency response altering means is illustrated. In this embodiment, components thereof corresponding to like components of the preceding embodiments are indicated by like numerals only of the next higher order. The components of the sensor section 222 are identical to those of section 22 of the embodiment of FIG. 1. In the housing formed by the cylindrical wall 218, a series of transverse dividers 260a and 260b are disposed to form chambers 262a and 262b.

The combination of the tubes 264a and 264b, which are located in the dividers 260a and 260b and which respectively reduce the rate of flow of liquid 248 between the chambers and between chamber 262a and the sensor 242, and the gas-filled bellows 266a and 266b absorb lower frequency changes and effectively restrict the sensitivity to high-frequency changes.

By proper design of the chambers 262a and 262b, the tubes 264a and 264b and the bellows 266a and 266b as well as by variation in the number of components provided, the frequency response sensitivity of the device can be determined. Obviously, the number of chambers can also be varied from that illustrated in this respect.

Figure 6:
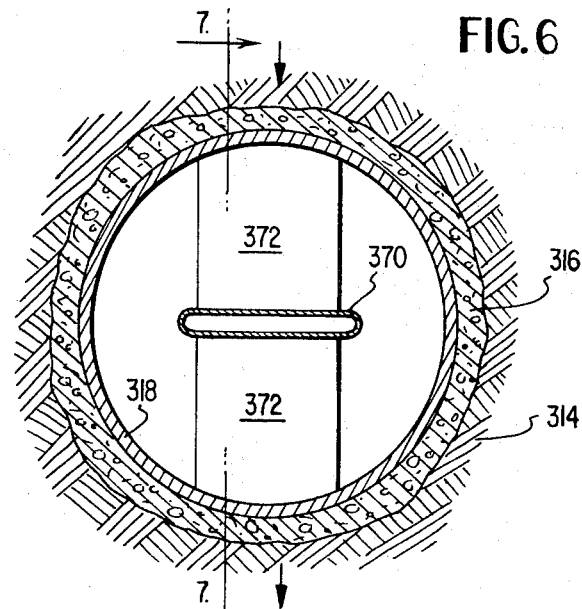
FIG. 6 is a sectional plan view of yet another variation in accordance with the invention installed in a bore hole.
Figure 7:
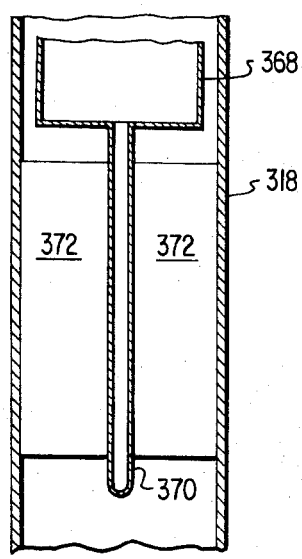
FIG. 7 is a sectional view of the structure of the device of FIG. 6 taken along the lines 7—7 thereof.

Referring now to FIGS. 6 and 7, a variation in the device of FIG. 1 is illustrated. In this embodiment, components thereof corresponding to like components of the preceding embodiments are indicated by like numerals only of the next higher order. This embodiment involves structure to limit the directional sensitivity of the sensor. The housing wall 318 has, disposed therein, a container 368 which is in communication, at the upper end thereof, with a sensing device such as 242 in FIG. 5. The container 368 has, depending therefrom, a transversely flattened portion 370 which is mechanically connected to the housing walls 318 by spacing blocks 372. The container 368 is filled with liquid as in the preceding embodiments and deformations of the wall 370 are transmitted therethrough to the sensor as was described above.

As can be seen by reference to FIG. 6, only deformations in the directions of the arrows will be transmitted to the depending portion 370, the spaced relationship of the remaining structure serving to insulate against deformation transmission in other directions.

Figure 8:
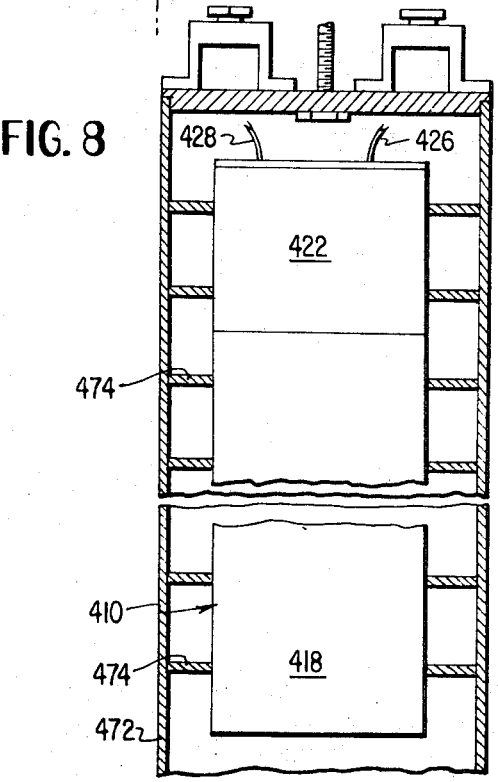
FIG. 8 is a view similar to FIG. 4 showing a further variation in accordance with the invention.

In FIG. 8 a further embodiment of the invention is illustrated. Again in this embodiment, components corresponding to like components of the preceding embodiments are indicated by like numerals of the next higher order. In FIG. 8 the casing 410, having components corresponding to the components of the embodiment of FIG. 3, is disposed in an outer housing 472. The outer housing is disposed in spaced relationship to the walls forming the casing 410 and is connected thereto by a series of annular plates 474. The plates 474 serve to transmit deformations of the outer housing 472 substantially normal to the centerline of the casing 410 and preclude transmission of deformations and influences traveling parallel to the centerline of the casing to thereby provide means to limit the deformation sensed by the device to substantially horizontal deformations. Such a limitation finds utility in situations where extraneous sources of strain, such as those emanating from above the surface of the earth, must be excluded.

What has been set forth above is intended primarily as exemplary to enable those skilled in the art in the practice of the invention. It should therefore be understood that within the scope of the appended claims, the device may be practiced other than as specifically described.

What is new and therefore desired to be protected by Letters Patent of the United States is:

1. A device for detecting deformation in solids comprising:
    a casing insertable in the solid, said casing having walls defining a substantially closed container;
    strain-sensing means mounted within said container; a liquid substantially filling said container and in fluid communication with the interior walls of the container and with at least one surface of the strain-sensing means to couple said walls and said sensing means for transmission of deformation of the walls of the container to the strain-sensing means; and
    means to rigidly couple said walls to the solid into which said casing is inserted to transmit deformation of the solid to the walls of the container and to produce pressure pulses in the liquid in the container and to simultaneously prestress the walls of the container wherein said means to couple said walls to the solid comprises cement which expands upon curing and exerts a prestress against the container and the solid.

2. A device in accordance with claim 1 wherein said strain-sensing means comprises a solion transducer.

3. A device in accordance with claim 1 wherein said sensing means comprises a bellows communicating with said liquid and a differential transformer coupled to said bellows and operable thereby.

4. A device in accordance with claim 1 further comprising means to restrict the frequency of the pressure pulses transmitted by said liquid to said strain-sensing means.

5. A device in accordance with claim 4 wherein said means for restricting the frequency of the pressure pulses comprises a capillary tube, a transverse wall in the container having an opening therethrough, means mounting the strain-sensing means above said opening and means mounting the capillary tube through said transverse wall.

6. A device in accordance with claim 4 wherein said means for restricting the frequency of the pressure pulses comprises at least one wall dividing said container into chambers, and a flow restricting tube providing communication between said chambers.

7. A device in accordance with claim 1 further comprising means to limit the directional sensitivity of said device.

8. A device in accordance with claim 1 further comprising means to limit the directional sensitivity of said device.

9. A device in accordance with claim 8 wherein said means comprises a second container in spaced inward relationship to the walls of said casing and rigid structural members connecting the second container to the walls of said casing, means mounting said strain-sensing means within the second container, and wherein said liquid is maintained within the second container.

10. The invention defined in claim 1 including liquid sump means, and a constricted passage connecting the sump means and the liquid in said container.

* * * * *